Nov. 12, 1957 — H. R. LEWIS — 2,812,832
HYDRAULIC BRAKE MECHANISM
Filed Nov. 18, 1955 — 2 Sheets-Sheet 2

INVENTOR.
HAROLD R. LEWIS,
BY
McMorrow, Berman + Davidson
ATTORNEYS.

United States Patent Office 2,812,832
Patented Nov. 12, 1957

2,812,832

HYDRAULIC BRAKE MECHANISM

Harold R. Lewis, Oakland, Calif.

Application November 18, 1955, Serial No. 547,696

3 Claims. (Cl. 188—90)

The present invention relates to a hydraulic brake mechanism for attachment to a rotatable shaft such as the drive shaft or axle of a truck, automobile, or bus.

An object of the present invention is to provide a hydraulic brake mechanism which may be used to supplement the brakes of a vehicle.

Another object of the present invention is to provide a hydraulic brake mechanism which may be used as a speed-controlling device in a truck, automobile, or bus by applying a drag to the drive shaft or axle of such a vehicle, and one which has means for adjusting the amount of drag applied.

A further object of the present invention is to provide a hydraulic brake mechanism for attachment to a rotatable shaft such as the drive shaft of a vehicle, one which is simple in structure and having few moving parts, one sturdily constructed and economical to manufacture and assemble.

Figure 1:
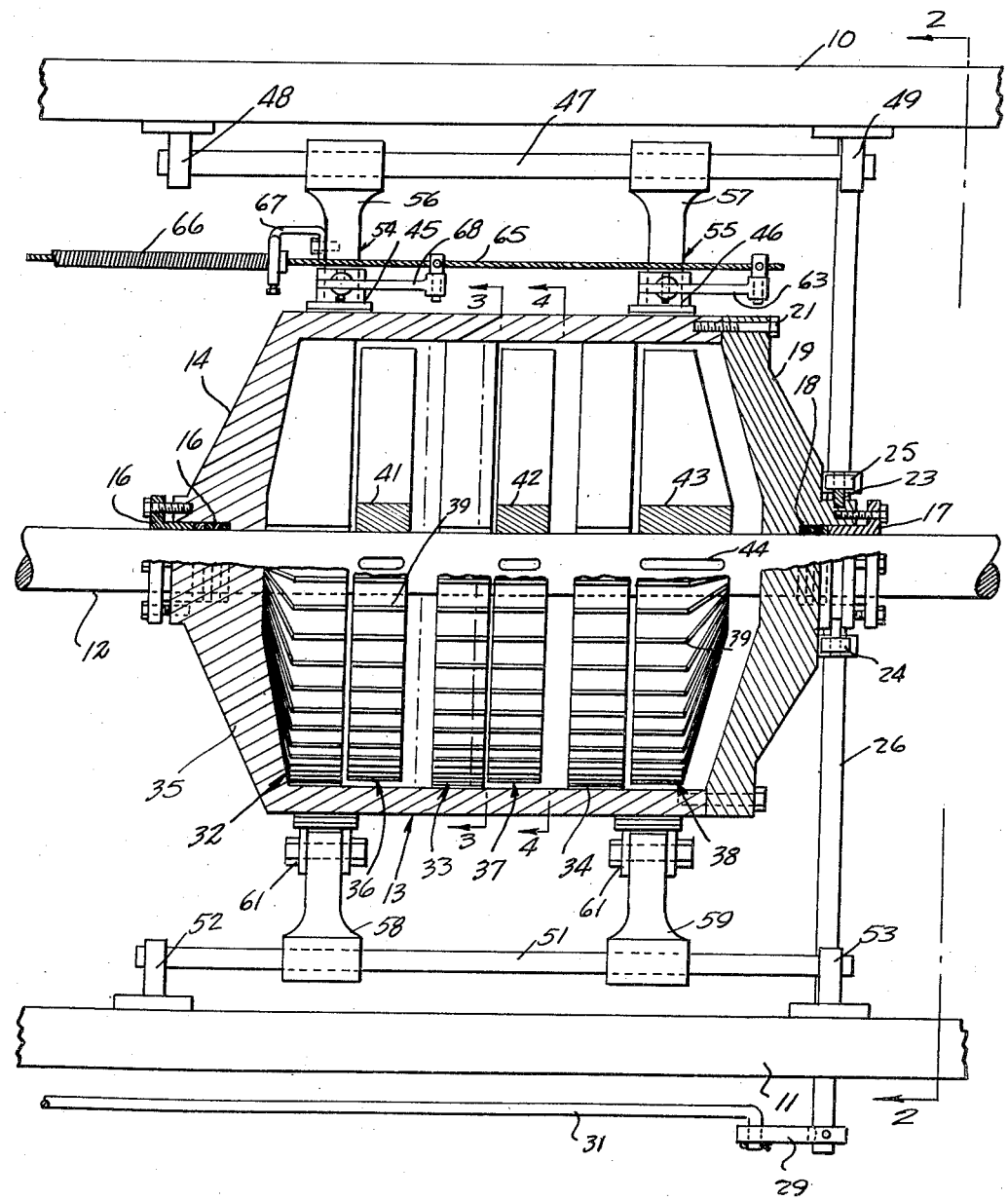
Figure 2:
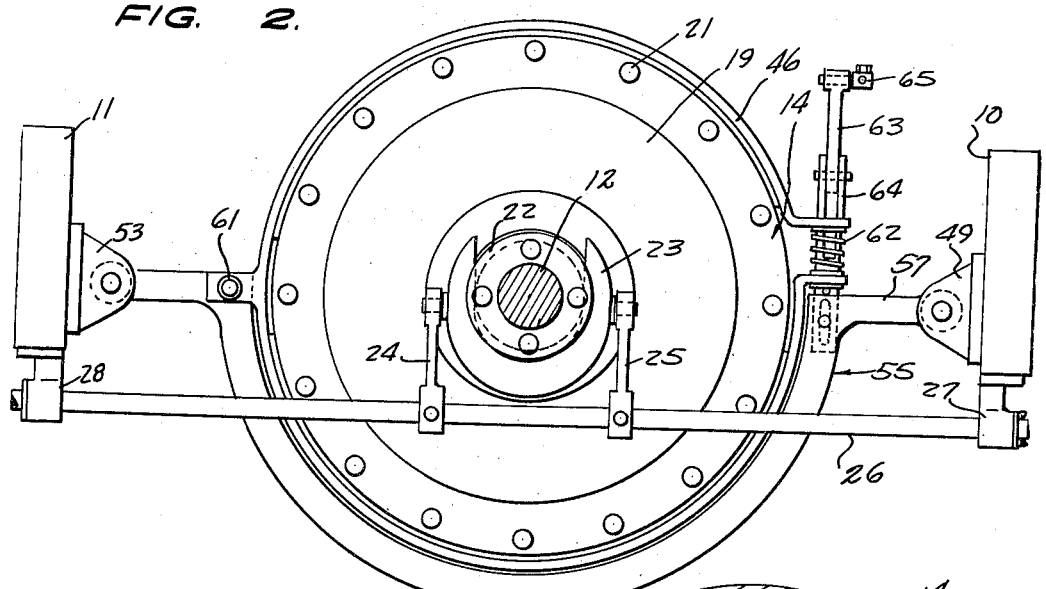
Figure 3:
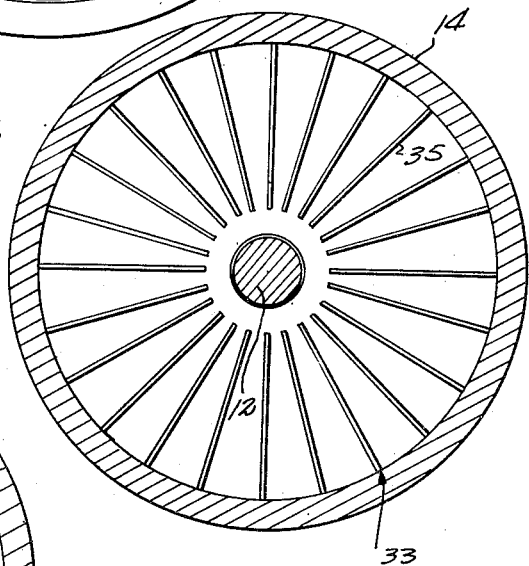
Figure 4:
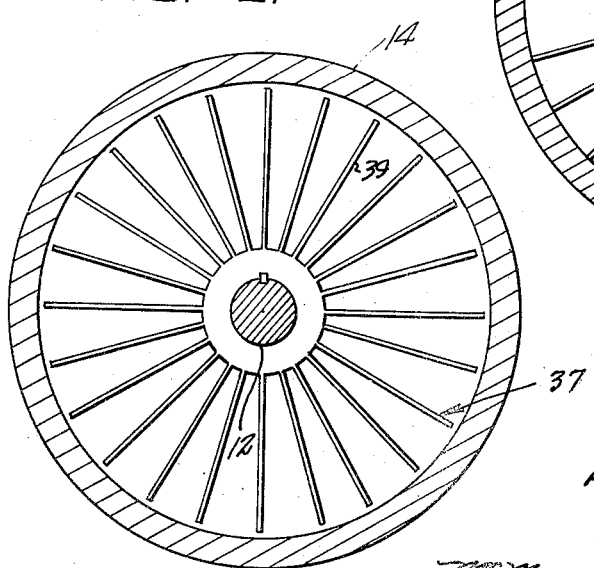

These and other objects and advantages of the present invention will be fully apparent from the following description when taken in connection with the annexed drawings, in which:

Figure 1 is a plan view of a portion of a vehicle frame with the hydraulic brake mechanism of the present invention installed on a drive shaft of the vehicle, the hydraulic brake mechanism being shown in section, Figure 2 is a view taken on the line 2—2 of Figure 1, Figure 3 is a sectional view taken on the line 3—3 of Figure 1, and Figure 4 is a sectional view taken on the line 4—4 of Figure 1.

Referring to the drawings, in which like numerals indicate like parts throughout the several views, a portion of a vehicle frame is shown in Figures 1 and 2 with frame members 10 and 11 arranged in parallel spaced relation. The drive shaft of the vehicle is positioned longitudinally of and between the frame members 10 and 11 and is designated by the reference numeral 12.

The hydraulic brake mechanism of the present invention is designated generally by the numeral 13 and is shown installed on the shaft 12 and comprises a closed hollow housing 14 axially surrounding a portion of the shaft 12 and connected to the shaft portion for rotation therearound as an axis, the housing 14 having a gland housing 15 at one end thereof with suitable packing interposed between the housing 14 and the adjacent portion of the shaft 12 as indicated at 16, the packing 16 forming a seal for that end of the housing 14. Another gland housing 17 is secured to the other end of the housing 14 and surrounds the adjacent portion of the shaft 12 with other packing 18 surrounding the shaft 12 and sealing that end of the housing 14. The end 19 of the housing 14 having the gland housing 17 is detachably secured by bolts 21 to the outer wall of the housing 14 and provides access to the interior of the housing 14.

The housing end 19 has a collar 22 positioned exteriorly thereof axially surrounding the adjacent portion of the shaft 12 and fixed to the housing end 19. A fork 23 is mounted for pivotal movement between the upper ends of a pair of upright arms 24 and 25 and is operably engaged in the collar 22. The arms 24 and 25 are arranged in spaced relation and are secured by their lower ends to the intermediate portion of a shaft 26 which is positioned transversely of the frame members 10 and 11 and is journaled in brackets 27 and 28 dependingly secured to the under side of the frame members 10 and 11, respectively. A crank arm 29 is connected to one end of the shaft 26 adjacent the frame member 11 and is pivotally connected by its outer end to one end of a control rod 31, the other end of the control rod 31 being in a location accessible to the operator of the vehicle. Rocking movement of the crank arm 29 by means of the control rod 31 causes rotation of the shaft 26 and effects by means of the fork 23 the limited sliding movement of the housing 14 upon the shaft 12.

A plurality of members, here shown as three in number and designated by the reference numerals 32, 33, and 34, each having a plurality of radially-arranged vanes 35, are arranged in side by side spaced relation and are positioned within the housing 14. The outer ends of the vanes 35 are fixedly secured to the inner walls of the housing 14.

A plurality of other members 36, 37 and 38, of the same number and each having a plurality of radially-arranged vanes 39, are positioned within the casing with the members 36, 37, and 38 in side by side relation with respect to the members 32, 33, and 34, respectively. The members 36, 37, and 38 each have a hub 41, 42, and 43, respectively, fixedly secured by keying to the shaft 12. One of the slots in the shaft 12 is indicated at 44 for securing the vaned member 38 to the shaft 12.

Friction-applying means is provided exteriorly of the housing 14 and is operable to engage the exterior surface of the housing 14 to slow down its rotation with the shaft 12 and to stop it from rotation with the shaft 12 when the latter is rotating. Specifically, this means embodies a pair of brake bands 45 and 46 arranged in spaced relation surrounding the housing 14 inwardly of each of the ends of the latter. A slide bar 47 is positioned longitudinally of and spaced from the one frame member 10 on the inner side of the later and is supported by its ends in brackets 48 and 49 which are fixedly secured to the frame member 10. Another slide bar 51 is similarly positioned with respect to the other frame member 11 and is supported by its ends in the brackets 52 and 53 which are secured to the inner side of the frame member 11.

U-shaped support members 54 and 55 extend under the housing 14 inwardly of each end of the latter and have extensions 56 and 57 on adjacent ends, respectively, connecting the support members 54 and 55 to the slide bar 47 and extensions 58 and 59 on the other adjacent ends connecting the support members 54 and 55 to the slide bar 51. The brake bands 45 and 46 are pivotally connected as at 61 to the support members 54 and 55, respectively. The free ends of each of the brake bands 45 and 46 are separated as shown in Figure 2 and are biased to the separated position by means of a spring 62. The operating means for each of the brake bands 45 and 46 is identical and is shown in Figure 2 with reference to the brake band 46. An operating lever 63 is supported for pivotal movement intermediate its ends in a post 64 which is carried by the support member 55. The lower end of the operating lever 63 is operatively connected to each of the free ends of the brake bands 46 for squeezing them together upon swinging movement of the upper end of the operating lever 63. The upper end of the operating lever 63 is connected to a flexible cable 65 which moves within a sheath 66 in response to an operating movement of the other end of the flexible cable 65 by the operator of the vehicle by suitable control means (not shown). The cable 65 and the sheath 66 constitute a flexible cable assembly, the adjacent end of the sheath 66 being supported by a bracket 67 on the extension 56 of the support member 54. A similarly-arranged operating lever 68 connects the cable 65 to the brake band 45.

In operation, the hydraulic brake mechanism of the present invention may be installed upon either the drive shaft or upon the drive axles of a vehicle such as a truck, automobile, or bus, and may be used to supplement the vehicle's brakes. Movement of the control rod 31 causes the housing 14 to move a limited distance upon the shaft 12, so that the vanes of each of the vaned members move from their positions adjacent each other to positions spaced away from each other, the spaced-away position for the vanes 35 of the vaned member 33 being shown in dotted lines in Figure 1. When the vanes 35 of the vaned members, 32, 33, and 34, are adjacent to the vanes 39 of the cooperating vaned members 36, 37, and 38, respectively, and the brake bands 45 and 46 are engaged with the exterior surface of the housing 14, the housing 14 is prevented from rotation and the pressure of the fluid within the housing on the vanes 35 resulting from the rotation of the vanes 39 of the cooperating vaned members 36, 37, and 38, creates a drag upon the shaft 12, thus supplementing the brake action of the vehicle brakes. When the vanes 35 are moved away from the cooperating vanes 39 there is less drag upon the shaft 12. This permits the operator of the vehicle to predetermine the amount of drag he wishes to have upon the shaft 12 and permits him to lock the housing 14 against rotation to produce this drag. This saves wearing of the brake bands 45 and 46 and also prolongs the life of the brakes of the vehicle. The extensions 56 and 57 are slidable upon the slide bar 47 and the extensions 58 and 59 are slidable upon the slide bar 51. This permits the brake bands 45 and 46 to be locked about the housing 14 and subsequent movement of the housing 14 relative to the shaft 12 to adjust the amount of drag to the amount desired.

What is claimed is:

1. The combination with a rotatable shaft, of a hydraulic brake mechanism comprising a closed hollow housing axially surrounding a portion of said shaft and connected to said shaft portion for rotation therearound as an axis and for limited sliding movement and adapted to contain a hydraulic fluid, a plurality of vaned members arranged in side by side spaced relation positioned within and fixedly attached to said housing, a cooperating vaned member positioned in side by side relation with respect to each of said vaned members and carried by said shaft portion, means operatively connected to one end of said housing for effecting the sliding movement of the latter, and friction-applying means exteriorly of said housing and operable to engage the exterior surface of said housing.

2. The combination with a rotatable shaft, of a hydraulic brake mechanism comprising a closed hollow housing axially surrounding a portion of said shaft and connected to said shaft portion for rotation therearound as an axis and for limited sliding movement and adapted to contain a hydraulic fluid, a plurality of vaned members arranged in side by side spaced relation positioned within and fixedly attached to said housing, a cooperating vaned member positioned in side by side relation with respect to each of said vaned members and carried by said shaft portion, means operatively connected to one end of said housing for effecting the sliding movement of the latter, and friction-applying means exteriorly of said housing and operable to engage the exterior surface of said housing, said friction-applying means embodying a brake band surrounding said housing intermediate the ends of the latter and operable to engage the exterior surface of said housing.

3. The combination with a rotatable shaft positioned longitudinally of and between a pair of spaced frame members, of a hydraulic brake mechanism comprising a closed hollow housing axially surrounding a portion of said shaft and connected to said shaft portion for rotation therearound as an axis and connected to said frame members for limited sliding movement with respect to said shaft portion and adapted to contain a hydraulic fluid, a plurality of vaned members arranged in side by side spaced relation positioned within and fixedly attached to said housing, a cooperating vaned member positioned in side by side relation with respect to each of said vaned members and carried by said shaft portion, friction-applying means exteriorly of said housing and operable to engage the exterior surface of said housing, a collar positioned exteriorly of one end of said housing axially surrounding the adjacent portion of said shaft and fixedly secured to said housing, a fork connected to said frame members for limited back and forth movement with respect to said shaft and operably engaging said collar for effecting the sliding movement of said housing, and manually-operable means operatively connected to said fork for effecting the movement of the latter.

References Cited in the file of this patent
UNITED STATES PATENTS

| | | |
|---|---|---|
| 1,238,447 | Severy | Aug. 28, 1917 |
| 2,061,656 | Guthrie | Nov. 24, 1936 |
| 2,241,189 | Dick | May 6, 1941 |
| 2,280,897 | Denman | Apr. 28, 1942 |
| 2,605,061 | Howe | July 29, 1952 |